United States Patent
Obrador et al.

(10) Patent No.: US 7,450,157 B2
(45) Date of Patent: Nov. 11, 2008

(54) REMOTE HIGH RESOLUTION PHOTOGRAPHY AND VIDEO RECORDING USING A STREAMING VIDEO AS A VIEW-FINDER

(75) Inventors: Pere Obrador, Mountain View, CA (US); Daniel Tretter, Palo Alto, CA (US); D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 10/023,951

(22) Filed: Dec. 21, 2001

(65) Prior Publication Data

US 2004/0202443 A1    Oct. 14, 2004

(51) Int. Cl.
*H04N 5/225* (2006.01)
(52) U.S. Cl. .................................... 348/220.1
(58) Field of Classification Search ............ 348/207.11, 348/207.1, 211.11, 211.12, 211.13, 211.99, 348/220.1
See application file for complete search history.

(56) References Cited

U.S. PATENT DOCUMENTS

| | | | |
|---|---|---|---|
| 5,666,215 A * | 9/1997 | Fredlund et al. ............ 358/487 |
| 5,673,205 A | 9/1997 | Brunson | |
| 5,896,171 A * | 4/1999 | Suzuki .................. 348/211.14 |
| 6,067,571 A * | 5/2000 | Igarashi et al. .............. 709/232 |
| 6,108,027 A | 8/2000 | Andrews et al. ............... 348/15 |
| 6,137,485 A | 10/2000 | Kawai et al. ................ 345/327 |
| 6,172,672 B1 * | 1/2001 | Ramasubramanian et al. .......................... 345/720 |
| 6,222,646 B1 | 4/2001 | Maurinus et al. ............ 358/440 |
| 6,366,914 B1 * | 4/2002 | Stern .......................... 707/10 |
| 6,556,241 B1 * | 4/2003 | Yoshimura et al. ...... 348/211.99 |
| 6,591,068 B1 * | 7/2003 | Dietz ......................... 396/429 |
| 6,665,453 B2 * | 12/2003 | Scheurich ................... 382/298 |
| 2001/0032335 A1 * | 10/2001 | Jones ......................... 725/105 |
| 2001/0037465 A1 * | 11/2001 | Hart et al. ................... 713/201 |
| 2002/0018124 A1 * | 2/2002 | Mottur et al. ............... 348/211 |
| 2002/0024602 A1 * | 2/2002 | Juen ........................... 348/220 |
| 2002/0069419 A1 * | 6/2002 | Raverdy et al. ............... 725/87 |
| 2004/0001214 A1 * | 1/2004 | Monroe ..................... 358/1.13 |

FOREIGN PATENT DOCUMENTS

| | | |
|---|---|---|
| DE | 19829470 | 1/1999 |
| DE | 19918096 | 10/1999 |
| WO | WO 99/45698 | 9/1999 |
| WO | WO 01/08415 | 2/2001 |

* cited by examiner

*Primary Examiner*—James M Hannett

(57) ABSTRACT

Using a joint video and still image pipeline technology, a network may be deployed through the Internet so that a user may acquire a remote high resolution photograph using a low resolution video streamed from a remote camera as a view-finder. The remote camera may enable the user to exercise control from a remote device through the network or other communication channels. A network server may store the video and the high resolution photograph, and either sends the video and the high resolution photograph to the user upon payment or posts the video and the high resolution photograph on a web page.

14 Claims, 7 Drawing Sheets

REMOTE HIGH RESOLUTION PHOTOGRAPHY AND VIDEO RECORDING USING A STREAMING VIDEO AS A VIEW-FINDER

TECHNICAL FIELD

The technical field relates to remote photography, and, in particular, to remote high resolution photography using a streaming video as a view-finder.

BACKGROUND

With advancements in telecommunications, remote photography utilizing electronic remote devices becomes increasingly desirable. A person often finds a scene interesting or a moment worth remembering, only to discover that either no camera is available to capture the image or he/she is not in the best position to take the picture. Similarly, during a sports event, an audience typically is unable to take the best picture of the game from a distance seat using a personal camera. In addition, a party in a teleconference environment who wants to keep a photograph of another party will realize that low resolution video transmission typically cannot generate high resolution pictures.

Remote photography is currently available in limited circumstances. For example, theme parks normally provide electronic photography systems for capturing images of customers participating in rides or events with digital cameras. The images are later sent to the customers through a network after verification of customer information and/or payment information. However, the electronic photography systems only randomly take pictures of the customers, i.e., the customers have no active control over the digital cameras regarding either timing or more advanced features, such as zooming. In addition, the customers cannot preview any live-video before the image acquisition.

SUMMARY

A method for acquiring remote high resolution photographs by a user using a streaming digital video as a view-finder includes connecting a remote device controlled by the user to one or more photo-video acquisition devices, acquiring a high resolution photograph from the remote device using a video streamed from the one or more photo-video acquisition devices as a view-finder, and processing and transmitting the video and the high resolution photograph obtained from the one or more photo-video acquisition devices, using a joint video and still image pipeline.

In one embodiment, the one or more photo-video acquisition devices request payment information from a user who wishes to control the one or more photo-video acquisition devices, verify the payment information submitted by the user, and enable the user to control the one or more photo-video acquisition devices from the remote device. The one or more photo-video acquisition devices may implement a queue system to allow multiple users to control the one or more photo-video acquisition devices in turn.

In another embodiment, a network server stores the video and the high resolution photograph, and either sends the video and the high resolution photograph to the user upon payment or posts the video and the high resolution photograph on a web page.

DESCRIPTION OF THE DRAWINGS

The preferred embodiments of the remote high resolution photography will be described in detail with reference to the following figures, in which like numerals refer to like elements, and wherein.

DETAILED DESCRIPTION

Using a joint video and still image pipeline technology, a network may be deployed through the Internet so that a user may acquire a remote high resolution photograph using a low resolution video streamed from a remote camera as a view-finder.

Figure 1:
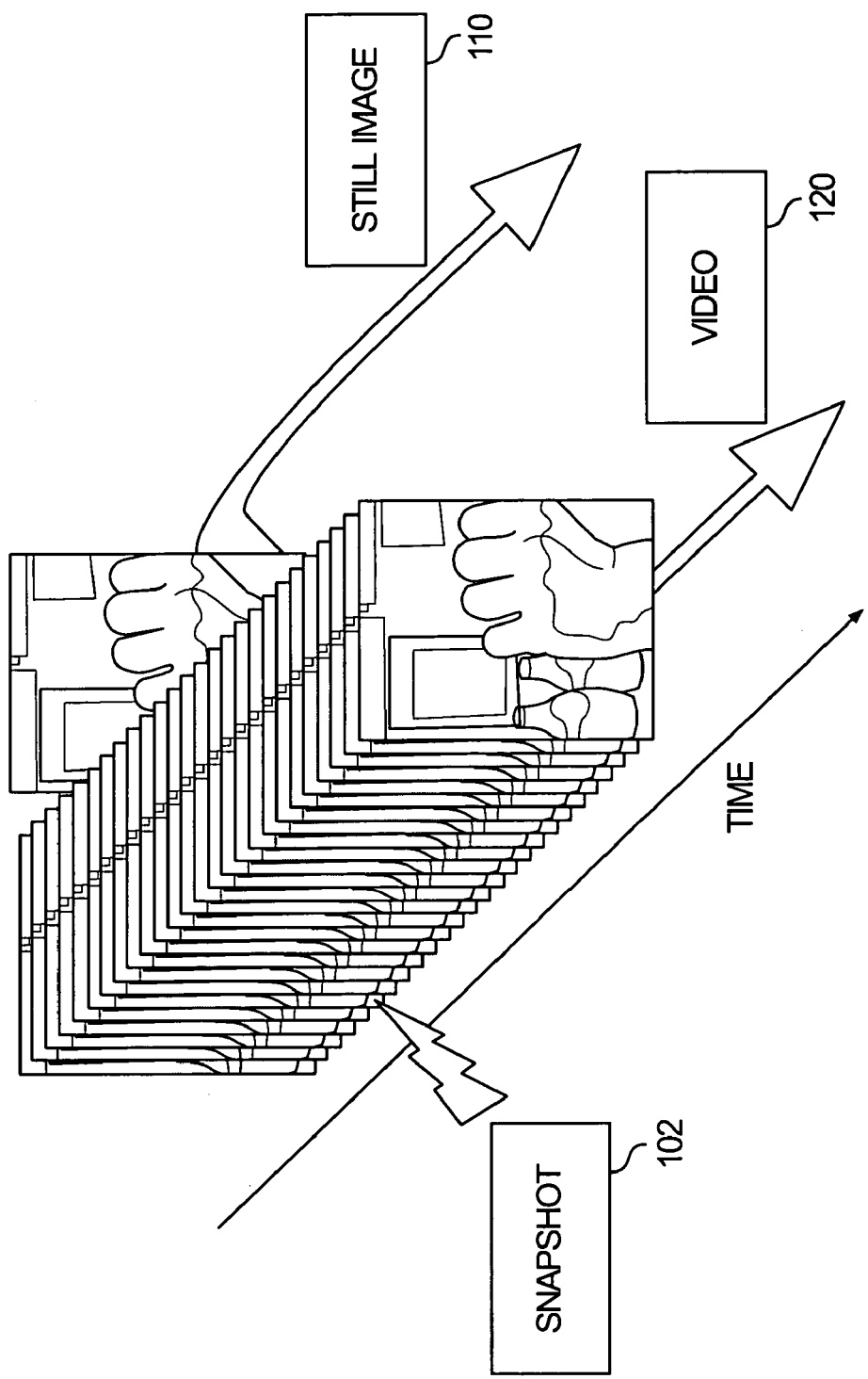
FIG. 1 illustrates an exemplary joint video and still image pipeline.

FIG. 1 illustrates an exemplary joint video and still image pipeline. The exemplary joint video and still image pipeline is capable of delivering videos 120 and still images 110, i.e., photographs, at the same time. For example, while a video 120 is being viewed or recorded, a snapshot 102 may be taken to generate the still image 110. The processing of the videos 120 and the still images 110 may be in parallel. The joint video and still image pipeline is described, for example, in U.S. patent application Ser. No. 10/023,808, entitled "Concurrent Dual Pipeline for Acquisition, processing and Transmission of Digital Video and High Resolution Digital Still Photographs," filed Dec. 21, 2001, which is incorporated herein by reference.

The joint video and still image pipeline leverages existing processing from cameras, i.e., demosaicing, color processing, and image compression. Additionally, the joint video and still image pipeline takes advantage of existing expertise on digital video, i.e., video compression and video streaming and transcoding. The still images 110 typically have high resolution with, for example, 2-4 mega pixels. The high resolution still images 110 also have sophisticated demosaicing that leaves almost no demosaicing artifacts and high quality color correction that generates accurate color. On the other hand, the videos 120 typically have mid or low resolution with, for example, 640×480 resolution. In contrast to high resolution still images 110, the mid or low resolution videos 120 have fast demosaicing and fast color correction, which produces high frame rate. The video is then real time compressed and streamed with low delay and good error protection.

Figure 2:
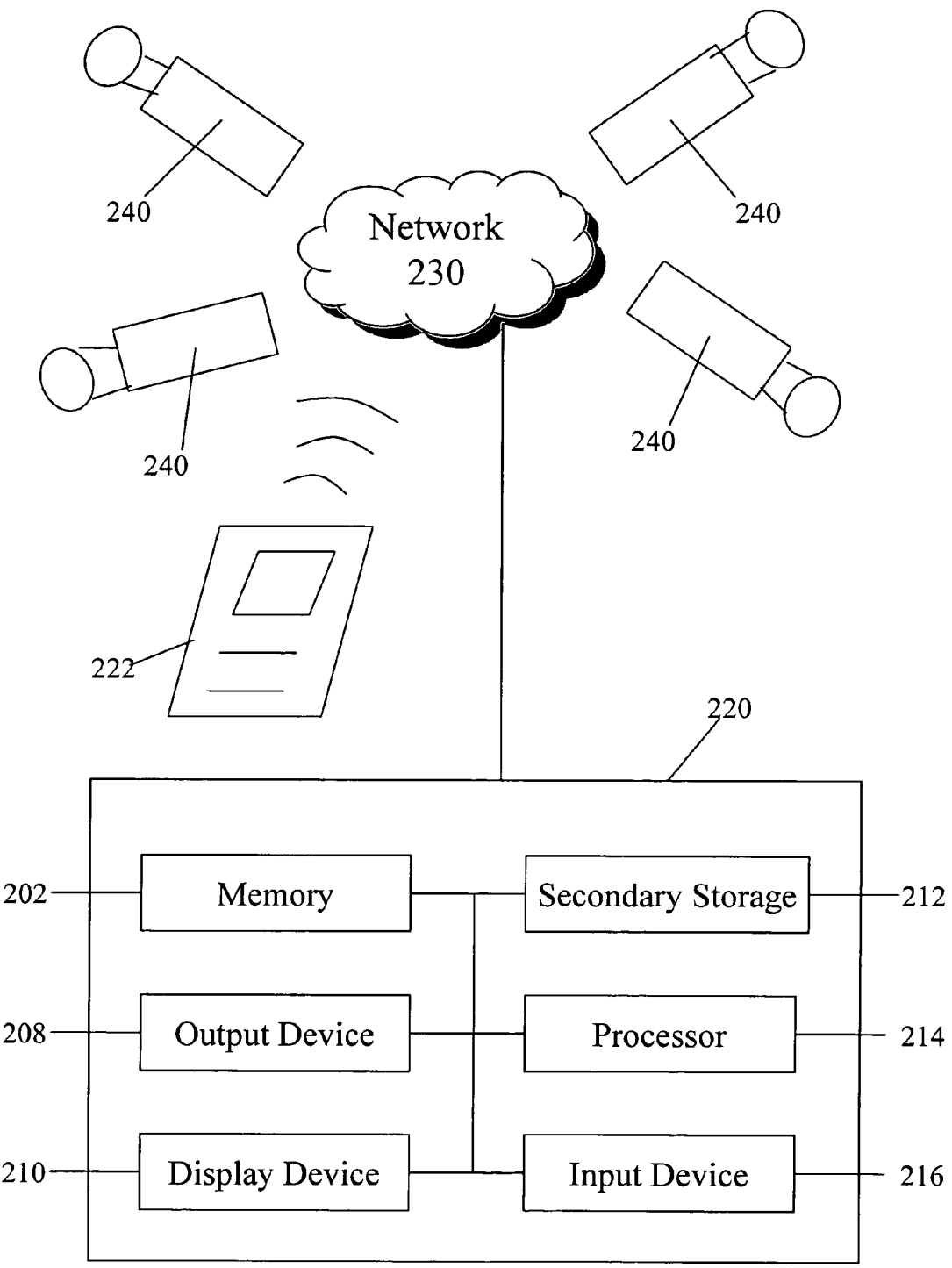
FIG. 2 illustrates an exemplary network and exemplary hardware components of a computer that may be used in connection with an exemplary method for acquiring remote high resolution photographs by a user using a streaming video as a view-finder.

FIG. 2 illustrates an exemplary network 230 and exemplary hardware components of a computer 220 that may be used in connection with an exemplary method for acquiring remote high resolution photographs by a user using a streaming video 120 as a view-finder. The network 230, such as the Internet or other type of computer or phone networks, connects a user's remote devices 222, 220 with one or more photo-video acquisition devices 240. The remote devices 222, 220 may be a handheld device 222 or a desktop computer 220, whereas the photo-video acquisition devices 240 may be remote video cameras.

The computer 220 typically includes a memory 202, a secondary storage device 212, a processor 214, an input device 216, a display device 210, and an output device 208. The computer 220 is connected to the remote video cameras 240 through the network 230, and may send commands to the cameras 240 and receive a streaming video and image 120 from the cameras 240. The memory 202 may include random access memory (RAM) or similar types of memory. The secondary storage device 212 may include a hard disk drive, floppy disk drive, CD-ROM drive, or other types of non-volatile data storage. The secondary storage device 212 may correspond with various databases or other resources. The processor 214 may execute applications or other information stored in the memory 202, the secondary storage 212, or received from the Internet or other network 230. The input device 216 may include any device for entering data into the computer 220, such as a keyboard, key pad, cursor-control device, touch-screen (possibly with a stylus), or microphone. The display device 210 may include any type of device for presenting visual image, such as, for example, a computer monitor, flat-screen display, or display panel. The output device 208 may include any type of device for presenting data in hard copy format, such as a printer, and other types of output devices including speakers or any device for providing data in audio form. The computer 220 can possibly include multiple input devices, output devices, and display devices.

Although the computer 220 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 220 to perform a particular method.

Figure 3A:
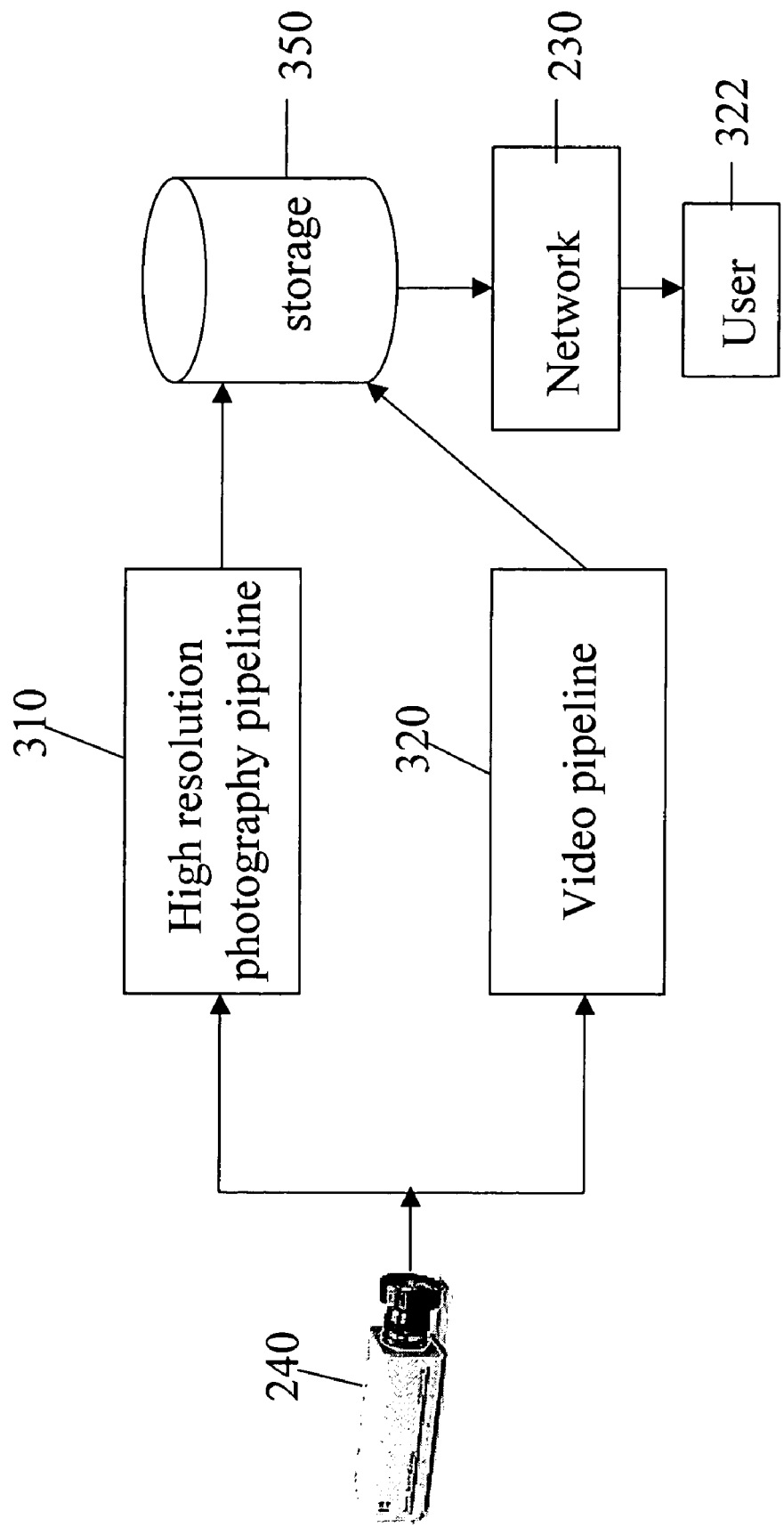
FIGS. 3(a) and 3(b) illustrate how the exemplary joint video and still image pipeline of FIG. 1 enables a user to acquire remote high resolution photographs through the exemplary network of FIG. 2.
Figure 3B:
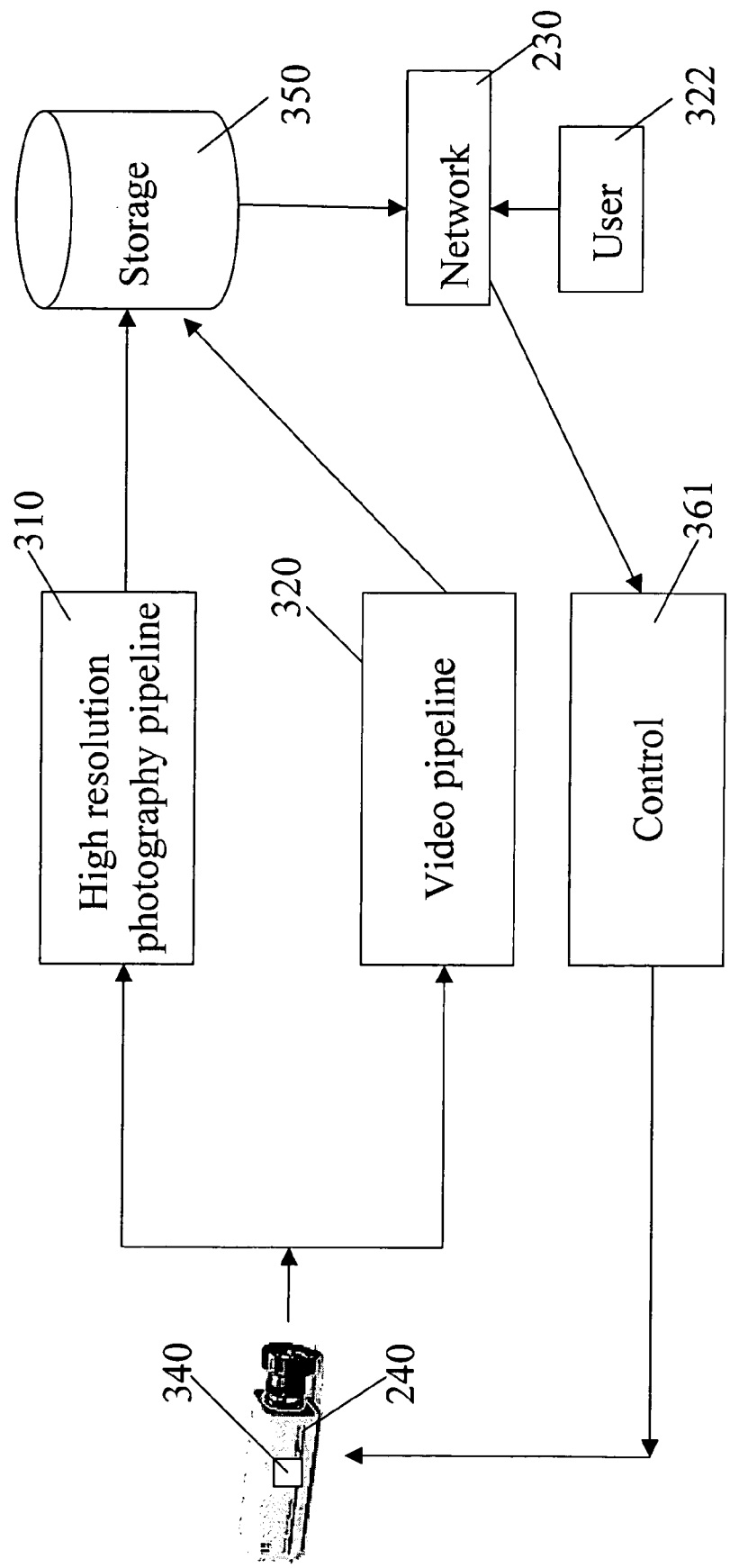

FIGS. 3(a) and 3(b) illustrate how the exemplary joint video and still image pipeline enables a user to acquire remote high resolution photographs 110 through the network 230. Referring to FIG. 3(a), the network 230 enables a user 322 to connect to one of the photo-video acquisition devices 240, such as remote video cameras, in the network 230 and to receive a video signal 120 that is being captured by the remote camera 240. In other words, the user 322 may use the received video signal 120 transmitted by the remote camera 240 as a view-finder on the hand held device 222 or the desktop computer 220. When the user 322 perceives an interesting scene on the view-finder, the user 322 may take a high resolution photograph 110. If the cameras 240 are fixed, i.e., cannot be controlled or moved by any user 322, multiple users 322 can take high resolution photographs using a same camera 240 simultaneously.

Alternatively, a remote camera 240 may be controlled by a user 322, as illustrated in FIG. 3(b). In order to control one of the cameras 240 for remote photography, the user 322 may need to log onto the remote camera 240 and submit personal information, such as internet protocol address, e-mail address, and payment information, such as credit card number. Each remote camera 240 may be a microcomputer with a memory (not shown), a microprocessor 340, an input device (not shown), an output device (not shown), and a network connection (not shown), similar to the computer 220. The microprocessor 340 in the remote camera 240 may verify the user's payment information before granting access of control to the user 322. Verification of customer information is described, for example, in U.S. Pat. No. 6,222,646, to Maurinus, et. al., entitled "Electronic Photography System," which is incorporated herein by reference.

In addition, the microprocessor 340 may implement a queue system for multiple users 322 to control the same camera 240. With the queue system, only after a previous user 322 logs off the camera 240, may another user 322 log onto the same camera 240 and exercise control 361. The control 261 may include tilting the remote camera 240 up or down, turning the camera 240 to the left or right, re-focusing the camera 240, or zooming the camera 240. The microprocessor 340 also controls motors in the remote camera 240 to perform the control commands received from the user 322.

The user 322 may use the remote camera 240 to view and record videos 120, as well as audio sounds. The user 322 may also acquire high resolution photographs 110, i.e., high resolution still images, at any time, using the video 120 streamed from the remote cameras 240 as a view-finder. The videos 120 and high resolution photographs 110 may be processed and transmitted using the joint video and still image pipeline, 320 and 310, respectively. Transmission of high resolution still images is described, for example, in U.S. Pat. No. 6,108,027, to Andrews, et. al., entitled "Progressive Still Frame Mode," which is incorporated herein by reference.

After the videos 120 and/or the high resolution photographs 110 are acquired, the videos 120 and/or the high resolution photographs 110 may be saved in a storage 350 on a network server, such as a multimedia database connected to the network 230. The handheld devices 222 typically has bandwidth restrictions for video transmission, whereas the network 230 may process high bandwidth transmission with high speed connection. Therefore, while the user 322 receives low quality streaming video 120 on the handheld device 222, the video 120 stored in the storage 350 may be of higher quality than the streaming video 120 used as a view-finder. Alternatively, if the user 322 accesses the remote camera 240 from a desktop computer 220 with a high speed connection to the network 230, the streaming video 120 used as a view-finder may be of higher quality, due to the high bandwidth connection.

The videos 120 and/or the high resolution photographs 110 may be posted on a web page or may be sent to the user 322, for example, by e-mail, once payment has been secured. The user 322 may store the videos 120 and/or high resolution photographs 110 in a local secondary storage 212, and may print the high resolution photographs 110 on a printer.

Figure 3C:
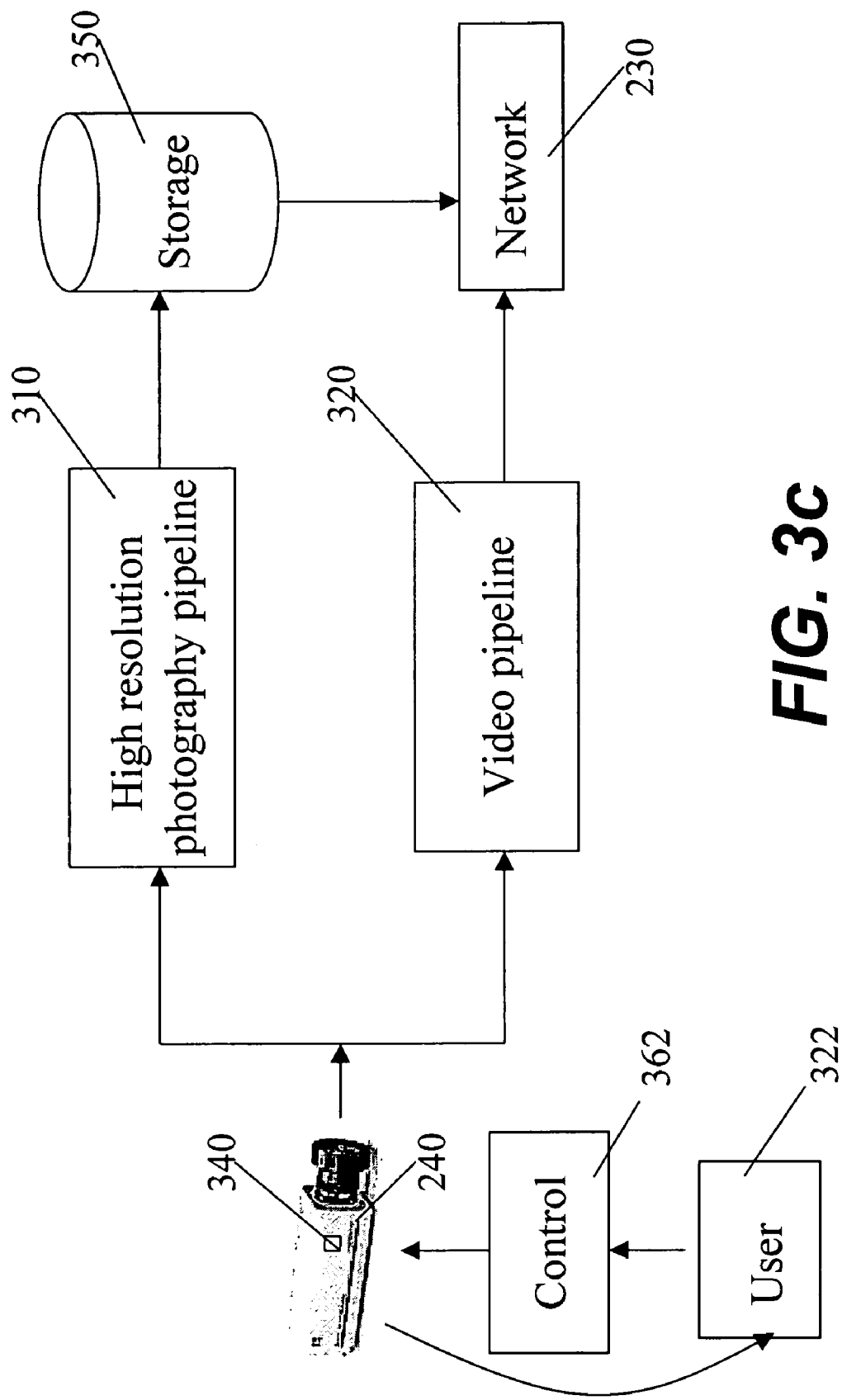
FIG. 3(c) illustrates how the user may control a remote camera to acquire remote high resolution photographs through a point-to-point connection.

FIG. 3(c) illustrates how the user 322 may control the remote camera 240 to acquire remote high resolution photographs 110 through a point-to-point connection, such as a direct wire connection, a infra-red remote control, or a telephone network. The user 322 typically connects to the remote camera 240 and receives low resolution video 120 through a communication channel, such as a direct wire connection, a infra-red channel, or a telephone network channel, which are well known in the art. The user 322 may also send control commands 362 to the remote camera 240 through a same or a different communication channel. After high resolution photographs 110 are acquired, the photographs 110 may be sent to the user 322 directly through similar channels or through the network 230.

As one example, in a mobile environment, a user 322 may use a handheld device 222, such as a cell phone or a handheld computer, to control and acquire high resolution photographs 110 using one of the remote cameras 240 in the network 230. The cameras 240 may be specially positioned to acquire from a wide angle pictures of, for example, a theme park, so that users 322 may acquire high resolution pictures 110 of themselves in the theme park using a streaming video 120 obtained from the remote cameras 240 as a view-finder. The high resolution photographs 110 may later be posted on a web page or emailed to the users 322 upon payment.

As another example, in a video conferencing environment where low resolution videos 120 are transmitted through a network, a party 322 may use another party's camera 240 to acquire a high resolution photograph 110 of the other party.

As yet another example, in a sports event, a user 322 may watch the sports event from a handheld device 222 through a remote camera 240 perfectly positioned to deliver the best view of the event. Using the handheld device 222, the user 322 may also record the entire event and/or acquire a high resolution photograph 110 using a video 120 streamed from the remote camera 240 as a view-finder.

Figure 4:
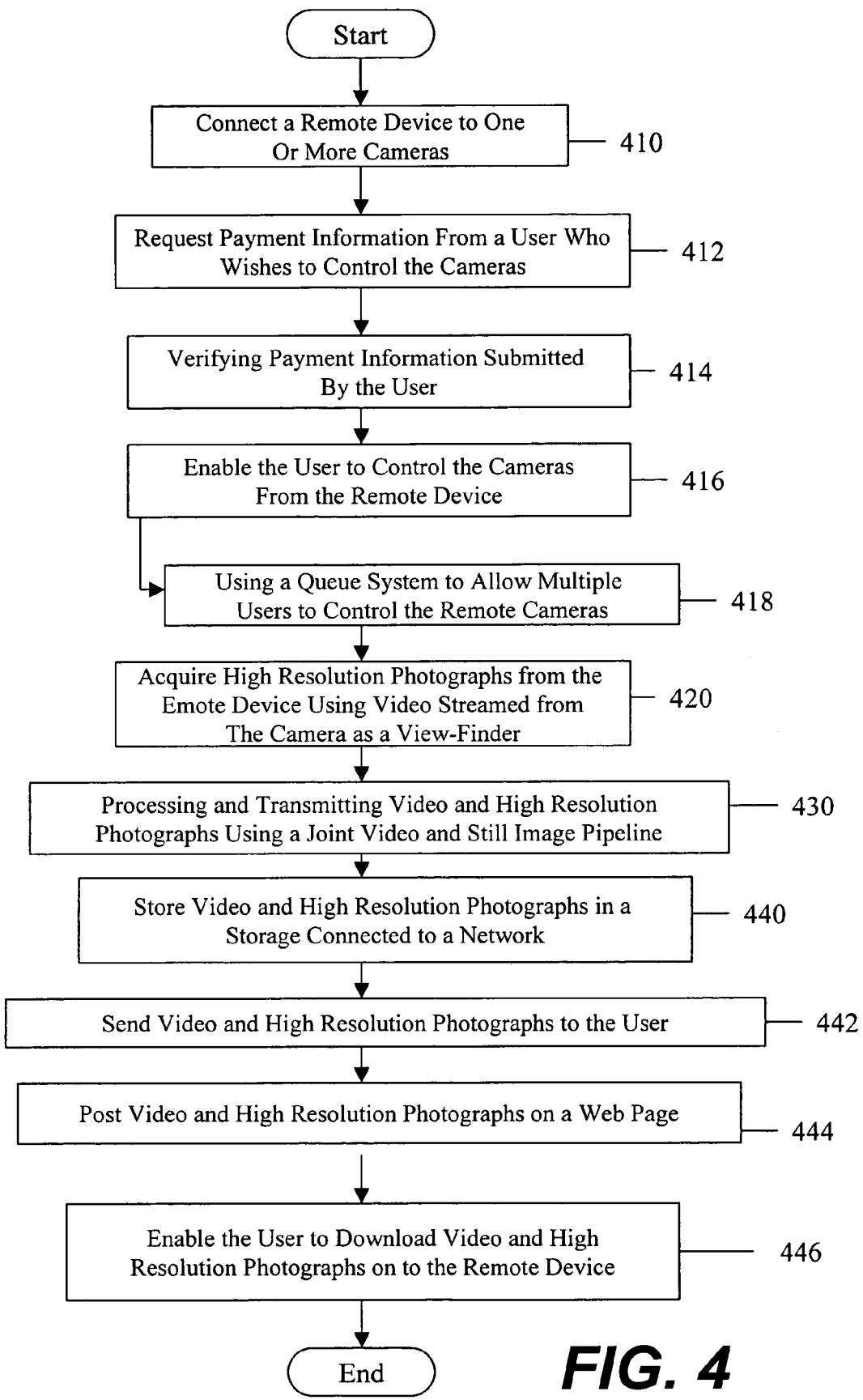
FIG. 4 is a flow chart illustrating the exemplary method of FIG. 2 for acquiring remote high resolution photographs by a user using a video streamed from a remote camera as a view-finder.

FIG. 4 is a flow chart illustrating an exemplary method for acquiring remote high resolution photographs 110 by a user 322 using a streaming video 120 as a view-finder. Step 410 involves connecting a remote device of the user 322, such as a handheld device 222 or a desktop computer 220, to one or more photo-video acquisition devices 240, such as remote video cameras, through a network 230 or other means, such as a direct wire connection, an infra-red remote control, or a telephone network. In order to exercise control over one of the remote cameras 240, the user 322 may need to provide payment information to the remote camera 240, step 412. After a microprocessor 340 in the remote camera 240 verifies the payment information submitted by the user 322, step 414, the user 322 may control the remote camera 240 from the remote device, step 416. The microprocessor 340 may implement a queue system to allow multiple users 322 to control a same remote camera 240 in turn, step 418.

Next, the network 230 enables the user 322 to view the video 120 streamed from the remote camera 240 and to acquire a high resolution photograph 110 from the remote device, using the streaming video 120 captured by the remote cameras 240 as a view-finder, step 420. The video 120 and the high resolution photograph 110 may be processed and transmitted in parallel using a joint video and still image pipeline, step 430. Accordingly, whatever the user 322 perceives on the view-finder is exactly what the user 322 photographs, as in a single lens reflex (SLR) camera. The network 230 may store the video 120 and/or the high resolution photograph 110 in a storage 350 on a network server, step 440. The stored video 120 may be of higher quality than the streaming video 120 used as a view-finder. The video 120 and/or the high resolution photograph 110 may then be sent to the user 322 upon payment, step 442. Alternatively, the video 120 and/or the high resolution photograph 110 may be posted on a web page, step 444, which enables the user 322 to download to a remote device, such as a desktop computer 220, step 446.

Figure 5:
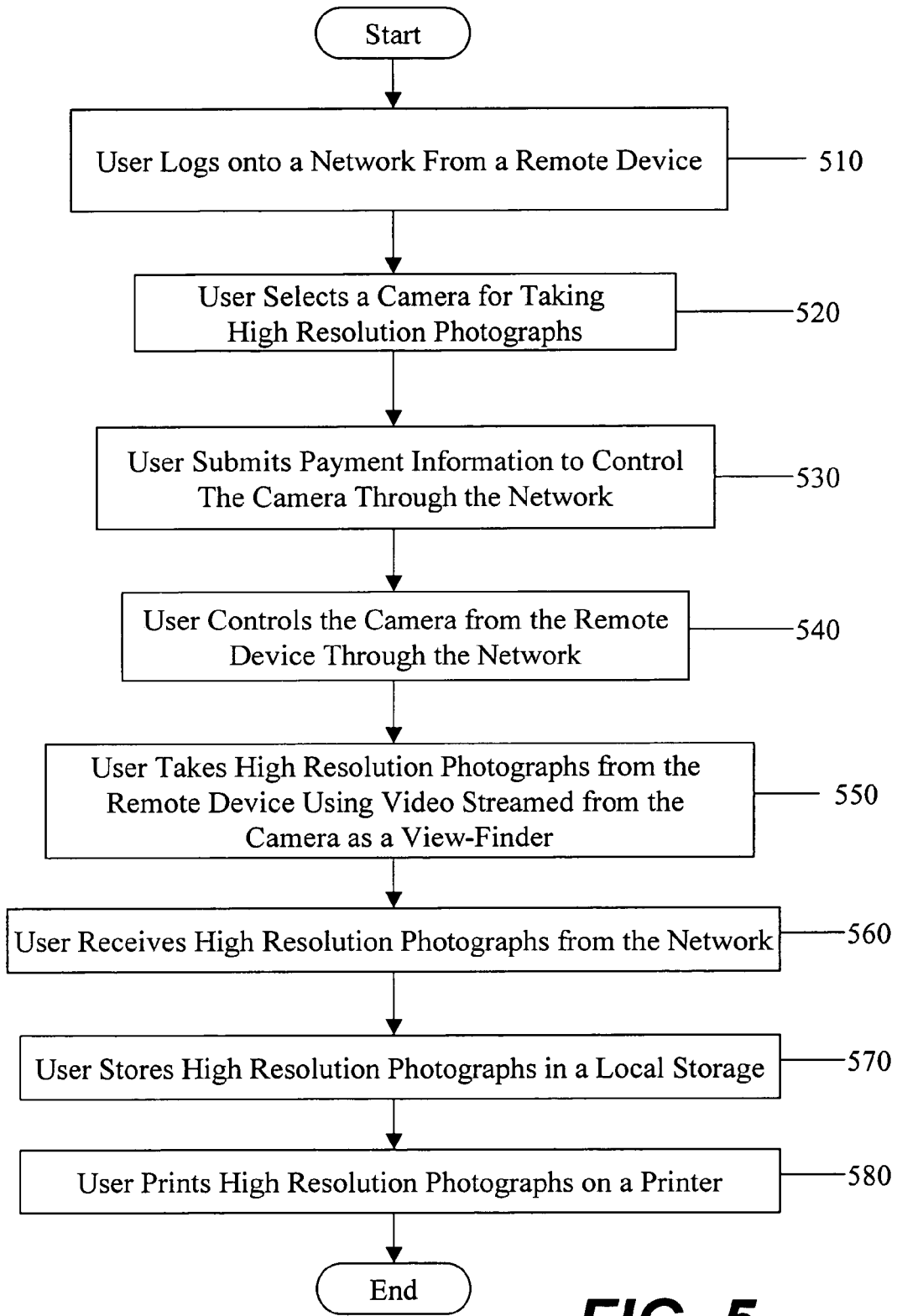
FIG. 5 is another flow chart illustrating how a user acquires remote high resolution photographs using a video streamed from a remote camera as a view-finder.

FIG. 5 is another flow chart illustrating how a user 322 acquires a remote high resolution photograph 110 using a streaming video 120 as a view-finder. First, the user 322 logs onto a network 230 from a remote device, such as a handheld device 222 or a desktop computer 220, step 510. The user 322 then selects a photo-video acquisition device 240, such as a remote video camera, in the network 230 for acquiring the high resolution photograph 110, step 520. The user 322 may need to submit payment information, step 530, in order to control the remote camera 240 through the network 230, step 540. Next, the user 322 views the streaming video 120 and acquires the high resolution photograph 110 from the remote device using the video 120 streamed from the remote camera 240 as a view-finder, step 550.

The user 322 may receive the video 120 and/or the high resolution photograph 110 on a remote device, such as a desktop computer 220, from the network 230, step 560, and store the video 120 and/or the photograph 110 in a local storage 212 connected to the desktop computer 220, step 570. Finally, the user 322 may print the high resolution photograph 110 on a printer connected to the desktop computer 220, step 580.

While the method and apparatus for acquiring remote high resolution photographs using a streaming video as a view-finder have been described in connection with an exemplary embodiment, those skilled in the art will understand that many modifications in light of these teachings are possible, and this application is intended to cover any variations thereof.

What is claimed is:

1. A method for acquiring remote high resolution photographs by a user using a streaming video as a view-finder, comprising:
   connecting a remote device to one or more photo-video acquisition devices individually comprising a camera, wherein the remote device is controlled by the user;
   using a connected one of the cameras, generating a video of a scene viewed using the respective camera;
   acquiring a high resolution photograph from the remote device using the video streamed from the one or more photo-video acquisition devices as a view-finder;
   communicating a command from the user to the camera wherein the communicating the command comprises communicating using a communications channel different than a pipeline configured to communicate the video and high resolution photograph and wherein the communications channel and the pipeline comprise different physical media configured to communicate electrical signals in parallel;
   altering an operation the camera with respect to the generation of the video responsive to the command; and
   processing and transmitting the video and the high resolution photograph obtained from the one or more photo-video acquisition devices.

2. The method of claim 1, wherein the connecting step includes connecting the remote device to the one or more photo-video acquisition devices through a network.

3. The method of claim 1, wherein the connecting step includes connecting the remote device to the one or more photo-video acquisition devices through a point-to-point connection.

4. The method of claim 1, further comprising:
   requesting payment information from a user who wishes to control the one or more photo-video acquisition devices; and
   enabling the user to control the one or more photo-video acquisition devices from the remote device.

5. The method of claim 4, further comprising verifying the payment information submitted by the user before enabling the user to control the one or more photo-video acquisition devices.

6. The method of claim 4, wherein the acquiring step includes using a queue system to allow multiple users to control the one or more photo-video acquisition devices.

7. The method of claim 1, further comprising storing the video and the high resolution photograph in a storage on a network server.

8. The method of claim 1, further comprising sending the video and the high resolution photograph to the user.

9. The method of claim 1, further comprising posting the video and the high resolution photograph on a web page.

10. The method of claim 9, further comprising
  requesting payment information from a user who wishes to download the video and the high resolution photograph from the web page; and
  enabling the user to download the video and the high resolution photograph onto the remote device.

11. The method of claim 1, further comprising storing the video and the high resolution photograph for a first time after the generating and the transmitting.

12. The method of claim 1, wherein the high resolution photograph has a resolution greater than a resolution of the video.

13. The method of claim 1, wherein the acquiring comprises acquiring during the generating the video comprising originally capturing the video of the scene as viewed in real time using the respective camera.

14. The method of claim 1, wherein the different physical media of the communications channel and the pipeline are configured to simultaneously communicate different respective electrical signals.

* * * * *

UNITED STATES PATENT AND TRADEMARK OFFICE
CERTIFICATE OF CORRECTION

PATENT NO. : 7,450,157 B2 Page 1 of 1
APPLICATION NO. : 10/023951
DATED : November 11, 2008
INVENTOR(S) : Pere Obrador et al.

It is certified that error appears in the above-identified patent and that said Letters Patent is hereby corrected as shown below:

On sheet 6 of 7, in Fig. 4, in Box "420", line 2, delete "Emote" and insert -- Remote --, therefor.

In column 6, line 45, in Claim 1, after "operation" insert -- of --.

In column 7, line 11, in Claim 10, delete "comprising" and insert -- comprising: --, therefor.

Signed and Sealed this

Seventh Day of April, 2009

JOHN DOLL
*Acting Director of the United States Patent and Trademark Office*